May 21, 1957
O. G. LANDSVERK
2,793,298
QUARTZ FIBER DOSIMETER
Filed July 6, 1954
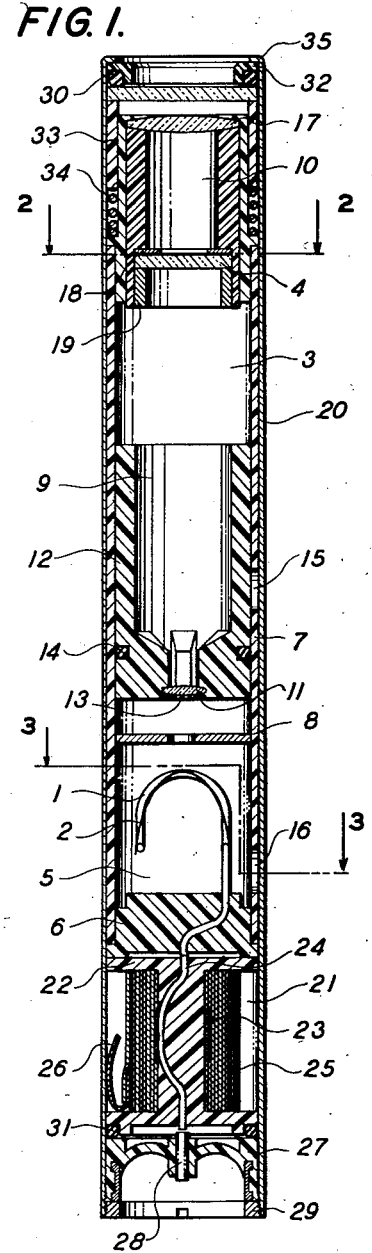
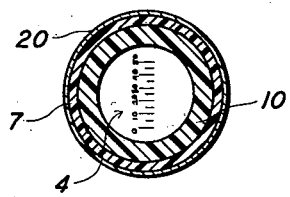
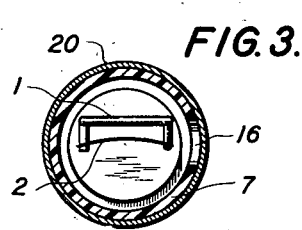
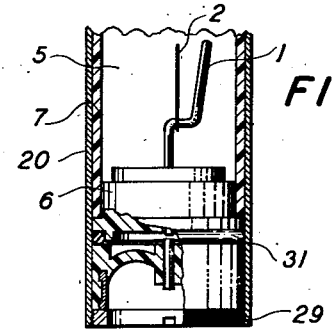
INVENTOR.
OLE G. LANDSVERK
BY *Ole G. Landsverk*
ATTORNEY.

United States Patent Office 2,793,298
Patented May 21, 1957

2,793,298

QUARTZ FIBER DOSIMETER

Ole G. Landsverk, Glendale, Calif.

Application July 6, 1954, Serial No. 441,232

10 Claims. (Cl. 250—83.3)

This invention consists of improvements in an instrument which is known as a direct-reading or self-reading quartz fiber dosimeter. The instrument will hereafter be referred to simply as a dosimeter.

A dosimeter is about the size of a fountain pen. It is clipped into a pocket or worn elsewhere on the person. Its function is to indicate by the position of the image of a quartz fiber on the reticle of a microscope eyepiece the integrated dose of X-rays or gamma rays that has passed through the ionization chamber of the instrument and so through the body of the wearer.

This application for patent refers to improvements to the structure of dosimeters and of their performance as follows:

1. A method for hermetically sealing a dosimeter while still permitting it to be quickly and easily disassembled for possible inspection or repair and to be subsequently reassembled. This can be done without having to cut the mounting tube open or causing the mounting barrel or any other part to be discarded and replaced as is the case with current models of sealed dosimeters.

2. An improvement which consists of making the molded polystyrene insulator of the quartz fiber voltmeter (hereafter referred to as the voltmeter) a separate unit from the spool-like structure on the core of which the polystyrene foil condenser, which regulates the full scale range of the dosimeter, is wound. These units have heretofore been molded in a single piece. The change results in greater flexibility in manufacture, added convenience in assembly and testing with consequent lowered cost.

3. Means are provided for making the final adjustment of the voltmeter after the voltmeter assembly has been mounted into exact position in the supporting tube that it will occupy in the final assembly. It is important to be able to do this for these reasons: (1) If the voltmeter has to be removed once or several times for adjustment in a jig or by trial and error the chance for introducing lint and dirt into the ionization chamber is greatly increased. (2) When the voltmeter is adjusted in its final position in the assembly this can be done quickly and easily and once done no further adjustments are needed. Variations from exact coaxial relation of the mounting tube, the objective lens and the eyepiece no longer matter since these parts will not again be moved with respect to each other. It should be noted that the position of the quartz fiber must be correct to about 0.001". It is impossible to hold interchangeable parts of this type coaxial within this limit, hence the method that is described above is of considerable importance.

4. An improvement which consists of means for permitting the microscope objective assembly to be suitably moved and positioned within the supporting tube of the instrument, after the major subassembly of the instrument has been completed, so that the objective lens may be brought into exact focussed relation with the quartz fiber of the voltmeter and also means to permanently secure the objective assembly so that the quartz fiber remains in focus.

This system is better than other methods that are employed for focusing because no preliminary focusing in jigs is necessary and no time consuming positioning of the objective by means of spacers or similar means is necessary. The only focusing is done in the major subassembly so that no part of the assembly is moved relative to another part after the focusing. The method is more convenient and the focus can be more exact and permanent.

Figures 1 to 4 illustrate the details of the structure of such an instrument and the improvements which are the subject of this application.

Fig. 4 represents a rotation of 90° around the axis of the dosimeter from the view of Fig. 1. Fig. 2 and Fig. 3 are sections perpendicular to the axis of the dosimeter at 2 and 3 respectively.

Referring to Fig. 1, 1 is the supporting frame of the quartz fiber voltmeter. It is normally made of spring tempered phosphor bronze wire. Quartz fiber 2 is attached at both its ends to frame 1. In the uncharged condition, fiber 2 is in the form of a semielliptic loop whose plane is roughly parallel to the plane of a portion of the frame 1 and is about .025" separated from it.

Fiber 2 is made conducting by sputtering on it a thin coat of platinum. When the voltmeter is charged, fiber 2 is repelled from wire frame 1 and is displaced in its normal operating range by an amount which is proportional to the applied potential. The central portion of fiber 2 is in focussed relation to microscope 3 so that the image of the fiber 2 falls on reticle 4.

As the voltage of the voltmeter in Figure 3 is increased, quartz fiber 2 will move away from frame 1. As a result its image which falls on reticle 4 of Fig. 2 will move in the direction from the end of the reticle which is marked 50 to the end which is marked zero. When the voltmeter is discharged, as for example by ionizing radiation which passes through ionization chamber 5 of Fig. 4, fiber 2 will move towards frame 1 and its image will move from the zero point on the reticle towards the end marked 50.

Dosimeters are made in full scale ranges from a few milliroentgens to several hundred roentgens. The volume of ionization chamber 5, the voltage sensitivity of the voltmeter and the electrostatic capacity of the charged system is in each case so adjusted that the correct dose is indicated on the reticle by the image of fiber 2.

A detailed description of the preferred construction follows.

Voltmeter frame 1 of Figure 1 is rigidly supported in ionization chamber 5 by means of molded polystyrene insulator 6. The insulator fits snugly into the end of supporting tube 7 and a flange of the insulator stops against the end of the tube. Tube 7 also supports and holds in coaxial relation aperture 8, objective lens assembly 9 and eyepiece assembly 10. Aperture 8 is cemented into tube 7 so as to form the upper end of ionization chamber 5. Tube 7 and aperture 8 are normally made of conducting Bakelite. This permits the wall of the ionization chamber to be properly grounded and, because of the low atomic number of the ingredients in the conducting Bakelite, helps to make the sensitivity of the instrument in the 80 key X-ray region approximately the same as for hard X-rays and gamma rays.

Objective lens assembly 9 consists of objective lens 11 which is molded into a supporting plastic tube 12. An aperture 13 is molded at the end of the tube 12 next to lens 11. O-ring 14 is mounted in a groove around tube 12. It function is to keep assembly 9 accurately centered in tube 7 and to provide friction with tube 7 so that the objective assembly 9 will remain in position after it is focussed on fiber 2 and before assembly 9 is cemented in place.

A hole 15 is provided in tube 7 so that assembly 9 may be slid into focussed relation after the major subassembly consisting of insulator 6, the voltmeter and assemblies 9 and 10 have been mounted in tube 7 for final adjustment and calibration. A second hole 16 is also provided in tube 7. The voltmeter can be adjusted through this hole by the use of suitable tools. This final adjustment in the exact position in which the voltmeter is to be incorporated in the instrument is very desirable (a) because the adjustment is critical and (b) because removing the voltmeter increases the hazard of damaging it and of introducing lint and dirt into the ionization chamber.

One end of eyepiece assembly 10 slips into the upper end of support tube 7 until its flange stops against the end of the tube. Eyepiece lens 17 is molded into one end of the assembly. At the other end of assembly 10 an aperture 18 and reticle 4 are secured in place against an internal shoulder of the molding by retaining ring 19.

The assembly which I have described so far and whose major parts are the voltmeter assembly consisting of parts 1, 2 and 6, objective lens assembly 9 and eyepiece assembly 10 mounted in tube 7 form a major subassembly for adjustment, calibration and testing. All my dosimeters, no matter what their range, contain this subassembly except that the numbering of the reticle is changed to fit the chosen range. This assembly, along with means to retain it and to charge and read it, when mounted in a barrel 20 of suitable length makes a standard dosimeter of 200 mr. full scale range. Fig. 4 shows the detail of the lower end of such a dosimeter.

To change the range to higher values a slightly longer barrel 20 (Fig. 1) is used and capacitor assembly 21 is inserted below insulator 6.

The usual way to produce a higher range has been to mold spool-like capacitor core 22 and insulator 6 in one piece. The separation of capacitor core 22 and insulator 6 requires only one range of dosimeter to be assembled—namely the 200 mr. range, instead of six or eight ranges. The actual range of the finished instrument may then be chosen as desired later by adding the proper capacitor assembly 21. This represents a considerable convenience and saving in cost of parts and in assembly time.

Molded core 22 of condenser assembly 21 has conducting ring 23 molded around its core. Connecting wire 24 is soldered to the inside surface of ring 23 and projects from the core at the upper end so as to make contact with voltmeter frame 1. A condenser 25 of suitable capacity is wound on core 22 so that its positive plate makes contact with the voltmeter through ring 23 and wire 24.

The negative plate of condenser 25 is grounded to mounting barrel 20 by means of a spring clip 26. Since the ionization chamber is conducting and is also grounded to the mounting barrel 20, it is possible to charge the dosimeter by applying a voltage to the plates of the condenser or suitably positioned projections with which the plates are in electric contact.

The condenser is wound with thin foil of extremely high specific resistance such as polystyrene, Kel-F or Teflon so that the drop in voltage per day of a charged condenser is less than 2% per day when the condenser is charged to about 150 volts.

In order to permit the instrument to be charged without exposing the interior parts, a flexible diaphragm 27 usually molded of polyethylene is mounted at the lower end of the instrument. The diaphragm supports pin 28 so that the pin clears wire 24 by about .025". A force of about four pounds must be exerted on pin 28 to move it into contact with wire 24. Diaphragm 27 is molded so that when it is mounted in place in barrel 20 and is secured by means of nut 29, pin 28 is recessed into the barrel about 0.200" so as to avoid accidental discharge.

The instrument is hermetically sealed by means of O-rings 30 and 31. These are forced against the inner surface of barrel 20 by guide channels 32 in the case of O-ring 30 and by a groove which is molded into the lower flange of condenser core 22 in the case of O-ring 31. Pressure in a direction which is parellel with the axis of the instrument is applied to both rings and to other parts of the complete assembly by spiral spring 34. Spring 34 acts on spacer tube 33 to force glass window 36 against O-ring 30. The spring also pushes against mounting tube 7 and condenser core 22 so that O-ring 31 is forced against the inward flange of diaphragm 27. Notice that in both cases the seal is produced by airtight disc-like structures which are pressed with sufficient force against the entire length of one side of the O-rings, the O-rings being suitably supported on their other side and being pressed against the inside surface of barrel 20 by supporting means that are internal to the O-rings. The airtight disc-like structures are window 36 and the lower end of core 22. In the preferred construction core 22 must be transparent but this is not always required. Window 36 must be transparent at least near its center.

Barrel 20 is normally an aluminum tube. It is threaded at the lower end to accept nut 29. The top end is spun over to form a flange 35 which serves as a stop for O-ring guide 32.

Attention is called to some pertinent facts regarding the structure of a dosimeter. The detailed description above is a favored construction which embodies the improvements for which application for patent is made. However the construction can be considerably different and still embody these improvements. Some examples follow.

1. In order for a dosimeter to have the same calibration at high and low altitudes, it is necessary only for the ionization chamber to be hermetically sealed. The seals may therefor be placed directly at the ends of the ionization chamber. Only a reasonably waterproof structure need then be provided at the ends of the instrument. It follows that the seals may be located at any convenient point from each end of the ionization chamber to the ends of barrel 20.

2. The detailed description provides for a transparent diaphragm 27, condenser assembly core 22 and insulator 6 so light may pass along the axis of the instrument to the voltmeter. This is not necessary however. For example in Patent No. 2,648,777, dated August 11, 1953, which was granted to the present applicant, the light was allowed to enter at the side of the ionization chamber and was deflected to the voltmeter and microscope by a small mirror attached to the inner end of the insulator.

3. A concave mirror may be used in place of a lens in an objective assembly which is slidable and which can be focussed by the use of probes through an opening in the side of supporting tube 7. Such a design was developed about two years ago by Dr. F. Shonka of Argonne National Lab., Lemont, Illinois. The voltmeter and at least part of the ionization chamber is then located between the eyepiece and the concave mirror and provision is made to admit light at the side of the barrel near the eyepiece end of the instrument which then passes down to the quartz fiber so the mirror reflects a real image back to the eyepiece reticle.

4. In place of the solid insulator 6 and the solid condenser core 22, which is shown in the detailed description, it is readily possible to have a hole at the center of the insulator for the light to pass through and to use a hollow core for the condenser, either plastic or metal. In fact the present applicant has designed such dosimeters. The core may be conducting because the condenser itself may be wound so it is highly insulated from the core. The point is that the novelty is the separation of the insulator from the core whereas either can then be made in many variations which are not novel.

I claim the following to be novel features and improvements of quartz fiber dosimeters:

1. The dosimeter is hermetically sealed as is required by current specifications, yet the instrument can be disassembled in 30 seconds or less for inspection or correction during the last stages of assembly and testing or for inspection and possible repair after the instrument is completed. All previous models that are hermetically sealed have to be cut open with consequent loss of parts and time and need for complete rebuilding if the parts are to be salvaged.

The hermetic sealing is accomplished by means of O-rings 30 and 31 of Fig. 1. The construction is explained in the detailed description. It should be noted that in this construction no reliance is placed on diaphragm 27 to provide a seal as has been done previously. The seal between pin 28 and the molded polyethylene diaphragm has always proved to be difficult to attain and has been unreliable.

2. As was explained in the detailed description, condenser assembly 21 is made in several suitable capacitances to give the various ranges in which the dosimeters are provided. If no condenser assembly is used a correspondingly shorter mounting barrel is used and the result is the standard low range model of 200 mr. full scale range.

This system provides a great deal of added flexibility in the course of assembly. All ranges are assembled and brought to the final test stage in the form of the major (low range) sub-assembly. This has the effect of requiring the assembly of only the one basic low range model instead of seven or eight separate models. If, in the last stages of assembly and testing, it is decided to make a high range unit, the eyepiece only of the basic sub-assembly is replaced by an eyepiece whose reticle is the same length but is properly marked for the desired range. This does not substantially affect the calibration or adjustment since any slight variation in the position of the reticle is relatively non-critical. A condenser assembly of the proper capacitance is then added to complete the assembly.

A further advantage of this system is that, since the condenser assembly 21 and the voltmeter assembly, which is comprised of parts 1, 2 and 6 of Figure 1, are separate and since these assemblies are by far the most expensive of the sub-assemblies of which the dosimeter is composed, it is important that, if one of these assemblies must be rejected, the other is not also lost as has been the case in all models of high range dosimeters up to this time.

3. Final adjustment of the voltmeter assembly which consists of parts 1, 2 and 6 of Figure 1 can be accomplished without removing the voltmeter and insulator from the exact position that they will occupy in the finished assembly. This is done by reaching through hole 16 in mounting tube 7 with suitable tools.

Because of the exacting nature of the adjustment and because of the need for excluding all foreign matter from the ionization chamber, it is very desirable not to have to remove the insulator from its position and by so doing to expose the interior parts.

Furthermore, the adjustment of the position of fiber 2 relative to the optical axis of the microscope has to be correct to about plus or minus 0.001". It is impossible to hold molded plastic parts such as are used in this structure so that parts are interchangeable to the degree that the required coaxial relation of the parts is not disturbed by an amount that is over 0.001". Therefore it is a matter of considerable importance to be able to adjust the voltmeter in its permanent position in the structure once and for all.

4. The objective lens assembly 9 of Figure 1 can be secured in exact focussed relation with fiber 2 after the main sub-assembly consisting of supporting tube 7, the voltmeter assembly which consists of parts 1, 2 and 6, objective lens assembly 9 and eyepiece assembly 10 has been completed, preliminary inspection has been made, final adjustment of the voltmeter assembly (see 3 above) has been made "in situ," and preliminary tests of the main sub-assembly have been made.

Objective lens sub-assembly 9 is moved into exact focus with fiber 2 by means of pushing a sharp steel point into the plastic assembly 9 through hole 15 and thereby applying a suitable force to assembly 9. The assembly is secured by thereupon applying suitable cement into hole 15 so as to bond objective lens assembly 9 to supporting tube 7.

This system permits the focusing to be easily accomplished without disturbing any other part of the main sub-assembly and at such a late stage in the process of assembly that the chance of an unsatisfactory focus resulting in the finished instrument is greatly reduced.

Now therefore what I claim is:

1. A dosimeter comprising, a cylindrical housing having an annular shoulder at the upper end thereof, an eye piece assembly mounted in the housing at the upper end thereof and held therein by said shoulder, a tubular support slidably seated in the housing below the eye piece assembly, an objective lens assembly seated for axial adjustment within said support, a quartz fiber volt meter assembly in the support below said lens assembly, a capacitor assembly seatable in the lower end of the housing, a flexible charging member mountable in the housing below the capacitor assembly, an element seated in threads of the housing to close the lower end thereof, a helical spring seated in the housing between the eye piece assembly and the tubular support to press the eye piece assembly against the housing shoulder and urging the tubular support and the capacitor assembly against the closure member at the lower end of the housing, and means hermetically sealing the joints at the ends of the housing.

2. A dosimeter comprising, a cylindrical housing having an annular shoulder at the upper end thereof, an eye piece assembly mounted in the housing at the upper end thereof and held therein by said shoulder, a tubular support slidably seated in the housing below the eye piece assembly, an objective lens assembly seated for axial adjustment within said support, means for locking the assembly rigidly in adjusted position within the support, a quartz fiber volt meter assembly in the support below said lens assembly, a capacitor assembly seatable in the lower end of the housing, a flexible charging member mountable in the housing below the capacitor assembly, an element seatable in threads of the housing to close the lower end thereof, a helical spring seated in the housing between the eye piece assembly and the tubular support to press the eye piece assembly against the housing shoulder and urging the tubular support and the capacitor assembly against the member at the lower end of the housing, and means hermetically sealing the joints at the ends of the housing.

3. A dosimeter comprising, a cylindrical housing having an annular shoulder at the upper end thereof, an eye piece assembly mounted in the housing at the upper end thereof and held therein by said shoulder, a tubular support slidably seated in the housing below the eye piece assembly, an objective lens assembly seated for axial adjustment within said support, means for locking the assembly rigidly in adjusted position within the support, a quartz fiber volt meter assembly in the support below said lens assembly, a disk rigidly seated in the support between the objective lens assembly and the volt meter assembly, the disk having a passage therethrough in axial alinement with the lens assembly, a capacitor assembly seatable in the lower end of the housing, a flexible charging member mountable in the housing below the capacitor assembly, a closure element engaging threads in the end of the housing to close the lower end thereof, a helical spring seated in the housing between the eye piece assembly and the tubular support to press the eye piece assembly against the housing shoulder and urging the tubular support and the capacitor assembly against the member at the lower end of the housing, and means hermetically sealing the joints at the ends of the housing.

4. A dosimeter comprising, a cylindrical housing having an annular shoulder at the upper end thereof, an eye piece assembly mounted in the housing at the upper end thereof and held therein by said shoulder, a reticle in said eye piece assembly, a tubular support slidably seated in the housing below the eye piece assembly, an objective lens assembly seated for axial adjustment within said support, a cylindrical insulator mounted in the lower end of the support, a supporting frame extending through and rising above said insulator, a quartz fiber element secured to said frame in spaced relation to the upper portion thereof for visual alinement with said reticle, a capacitor assembly seatable in the lower end of the housing, a flexible charging member mountable in the housing below the capacitor assembly, a closure element seatable in threads of the housing to close the lower end thereof, a voltage charging stem extending through said member, a current conductor seated in the capacitor, the ends of the conductor registering with the lower end of said supporting frame and the upper end of the charging stem, a helical spring seated in the housing between the eye piece assembly and the tubular support to press the eye piece assembly against the housing shoulder and urging the tubular support, the insulator and the capacitor assembly against the closure member at the lower end of the housing thereby to cause the ends of the current conductor to contact the ends of the supporting frame and the charging stem, and means hermetically sealing the joints at the ends of the housing.

5. A dosimeter comprising, a cylindrical housing having an annular shoulder at the upper end thereof, an eye piece assembly mounted in the housing at the upper end thereof and held therein by said shoulder, a reticle in said eye piece assembly, a tubular support slidably seated in the housing below the eye piece assembly, an objective lens assembly seated for axial adjustment within said support, a cylindrical insulator mounted in the lower end of the support, a supporting frame extending through and rising above said insulator, the tubular support having a passage through the wall thereof affording access to the supporting frame for adjustment thereof, a quartz fiber element secured to said frame in spaced relation to the upper portion thereof for visual alinement with said reticle, a capacitor assembly seatable in the lower end of the housing, a flexible charging member mountable in the housing below the capacitor assembly, a closure element seatable in threads of the housing to close the lower end thereof, a voltage charging stem extending through said member, a current conductor seated in the capacitor, the ends of the conductor registering with the lower end of said supporting frame and the upper end of the charging stem, a helical spring seated in the housing between the eye piece assembly and the tubular support to press the eye piece assembly against the housing shoulder and urging the tubular support, the insulator and the capacitor assembly against the closure element at the lower end of the housing thereby to cause the ends of the current conductor to contact the ends of the supporting frame and the charging stem, and means hermetically sealing the joints at the ends of the housing.

6. A dosimeter comprising, a cylindrical housing having an annular shoulder at the upper end thereof, an eye piece assembly mounted in the housing at the upper end thereof and held therein by said shoulder, a tubular support slidably seated in the housing below the eye piece assembly, an objective lens assembly seated for axial adjustment within said support, the tubular support having a passage through the wall thereof affording access to the lens assembly for axial adjustment thereof, means rigidly securing the assembly in adjusted position within the support, a quartz fiber volt meter assembly in the support below said lens assembly, a capacitor assembly seatable in the lower end of the housing, a flexible charging member mountable in the housing below the capacitor assembly, an element seatable in threads of the housing to close the lower end thereof, a helical spring in the housing between the eye piece assembly and the tubular support to press the eye piece assembly against the housing shoulder and urging the tubular support and the capacitor assembly against the closure element at the lower end of the housing, and means hermetically sealing the joints at the ends of the housing.

7. A dosimeter comprising, a cylindrical housing having an annular shoulder at the upper end thereof, an eye piece assembly mounted in the housing at the upper end thereof and held therein by said shoulder, a tubular support slidably seated in the housing below the eye piece assembly, an objective lens assembly seated for axial adjustment within said support, an O-ring seated in a groove of the assembly to contact the inner wall of the tubular support to lock the assembly in adjusted position therein, a quartz fiber volt meter assembly in the support below said lens assembly, a capacitor assembly seatable in the lower end of the housing, a flexible charging member mountable in the housing below the capacitor assembly, an element seatable in threads of the housing to close the lower end thereof, a helical spring seated in the housing between the eye piece assembly and the tubular support to press the eye piece assembly against the housing shoulder and urging the tubular support and the capacitor assembly against the closure member at the lower end of the housing, and means hermetically sealing the joints at the ends of the housing.

8. A dosimeter comprising, a cylindrical housing having an annular shoulder at the upper end thereof, a transparent disk seated in the housing against said shoulder, an eye piece assembly mounted in the housing at the upper end thereof and held therein by contact with said disk, a tubular support slidably seated in the housnig below the eye piece assembly, an objective lens assembly seated for axial adjustment within said support, a quartz fiber volt meter assembly in the support below said lens assembly, a capacitor assembly seatable in the lower end of the housing, a flexible charging member mountable in the housing below the capacitor assembly, an element seatable in threads of the housing to close the lower end thereof, a helical spring seated in the housing between the eye piece assembly and the tubular support to press the eye piece assembly against the housing shoulder and urging the tubular support and the capacitor assembly against the closure element at the lower end of the housing, and means hermetically sealing the joints at the ends of the housing.

9. A dosimeter comprising, a cylindrical housing having an annular shoulder at the upper end thereof, an eye piece assembly mounted in the housing at the upper end thereof and held therein by said shoulder, a reticle in said eye piece assembly, a tubular support slidably seated in the housing below the eye piece assembly, an objective lens assembly seated for axial adjustment within said support, a cylindrical insulator mounted in the lower end of the support, a supporting frame extending through and rising above said insulator, a quartz fiber element secured to said frame in spaced relation to the upper portion thereof for visual alinement wtih said reticle, a capacitor assembly seatable in the lower end of the housing, a flexible charging member mountable in the housing below the capacitor assembly, an element seatable in threads of the housing to close the lower end thereof, a voltage charging stem extending through said member, a current conductor seated in the capacitor, the ends of the conductor registering with the lower end of said supporting frame and the upper end of the charging stem, said capacitor assembly including a spool-like core, a conducting ring molded in position about the core, a condenser film wound on the core for contact with the volt meter through the conducting ring and the said current conductor in the capacitor, a helical spring seated in the housing between the eye piece assembly and the tubular support to press the eye piece assembly against the housing shoulder and urging the tubular support, the insulator and the capacitor assembly against the closure element at the lower end of the housing thereby to cause the ends of the current conductor to contact the ends of the supporting frame and the charging stem, and means hermetically sealing the joints at the ends of the housing.

10. A dosimeter comprising, a cylindrical housing having an annular shoulder at the upper end thereof, an eye piece assembly mounted in the housing at the upper end thereof and held therein by said shoulder, a tubular support slidably seated in the housing below the eye piece assembly, an objective lens assembly seated for axial adjustment within said support, a quartz fiber volt meter assembly in the support below said lens assembly, a capacitor assembly seatable in the lower end of the housing, a flexible charging member mountable in the housing below the capacitor assembly, an element seatable in threads of the housing to close the lower end thereof, a helical spring seated in the housing between the eye piece assembly and the tubular support to press the eye piece assembly against the housing shoulder and urging the tubular support and the capacitor assembly against the closure member at the lower end of housing, and O-rings seated against the annular shoulder and the flexible closing element hermetically to seal the assemblies seated within the cylindrical housing.

References Cited in the file of this patent

UNITED STATES PATENTS

| | | |
|---|---|---|
| 2,634,374 | Shonka | Apr. 7, 1953 |
| 2,638,553 | Landsverk et al. | May 12, 1953 |
| 2,648,777 | Landsverk | Aug. 11, 1953 |